US012725492B2

(12) United States Patent
Imaoka et al.

(10) Patent No.: US 12,725,492 B2
(45) Date of Patent: Sep. 1, 2026

(54) TWO-WAY COMMUNICATION DEVICE SYSTEM

(71) Applicant: Panasonic Holdings Corporation, Osaka (JP)

(72) Inventors: Noriaki Imaoka, Osaka (JP); Miyuki Kitabatake, Kanagawa (JP); Kota Nakahira, Osaka (JP); Takeshi Ando, Kyoto (JP); Masaki Yamamoto, Nara (JP); Kenji Suzuki, Ibaraki (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 227 days.

(21) Appl. No.: 18/631,123

(22) Filed: Apr. 10, 2024

(65) Prior Publication Data

US 2024/0257619 A1 Aug. 1, 2024

Related U.S. Application Data

(63) Continuation of application No. PCT/JP2022/029993, filed on Aug. 4, 2022.

(30) Foreign Application Priority Data

Oct. 13, 2021 (JP) ................................ 2021-168234

(51) Int. Cl.
*G08B 5/28* (2006.01)
*G08B 5/36* (2006.01)

(52) U.S. Cl.
CPC ................ *G08B 5/28* (2013.01); *G08B 5/36* (2013.01)

(58) Field of Classification Search
CPC ........ G06F 3/0481; G06F 13/00; G06F 16/93; G06Q 30/02; G06Q 50/10; G08B 5/28;
(Continued)

(56) References Cited

U.S. PATENT DOCUMENTS 5,343,461 A * 8/1994 Barton ..................... H04L 1/24 714/716
5,694,555 A * 12/1997 Morriss .............. G06F 13/4291 710/100

(Continued)

FOREIGN PATENT DOCUMENTS

JP 63-217857 9/1988
JP 2002-307338 10/2002

(Continued)

OTHER PUBLICATIONS

International Search Report of PCT application No. PCT/JP2022/029993 dated Oct. 4, 2022.

*Primary Examiner* — Stephen R Burgdorf
(74) *Attorney, Agent, or Firm* — Wenderoth, Lind & Ponack L.L.P.

(57) ABSTRACT

A two-way communication device system includes: a first two-way communication device; and a second two-way communication device installed at a different location from the first two-way communication device and configured to communicate with the first two-way communication device The two-way communication device system creates an operator input operation history when an input operation is received for the first time, transmits an input signal to the second two-way communication device, creates an other-device input operation history when an input signal is received for the first time, maintains a first state when both the operator input operation history and the other-device (Continued)

1 input operation history do not exist, a second state when only one of the operator input operation history and the other-device input operation history exists, and a third state when both of the operator input operation history and the other-device input operation history exist, and deletes both the operator input operation history and the other-device input operation history at a specific cycle date and time.

4 Claims, 8 Drawing Sheets

(58) Field of Classification Search
CPC .......... G08B 5/36; G08C 17/00; G08C 17/02; H04B 10/116; H04B 10/1143; H04M 1/247; H04M 1/2535; H04M 1/575; H04M 1/72412; H04M 3/2218; H04M 3/38; H04M 11/00; H04M 2250/60; H04N 21/41265; H04W 4/10; H04W 4/021; H04W 8/22; H04W 12/08
USPC .......................................................... 340/6.1
See application file for complete search history.

(56) References Cited

U.S. PATENT DOCUMENTS

| | | | | |
|---|---|---|---|---|
| 7,195,490 | B1 * | 3/2007 | Scafidi | G09B 19/00 434/236 |
| 2003/0071847 | A1 * | 4/2003 | Vacquie | H04L 51/224 715/772 |
| 2008/0162648 | A1 * | 7/2008 | Leung | G06Q 10/107 709/206 |
| 2008/0290177 | A1 * | 11/2008 | Halbur | G06Q 30/02 235/494 |
| 2019/0104402 | A1 * | 4/2019 | Pai | H04W 4/10 |
| 2021/0320894 | A1 | 10/2021 | Nakano et al. | |

FOREIGN PATENT DOCUMENTS

| | | |
|---|---|---|
| JP | 2002-314707 | 10/2002 |
| JP | 2004-080653 | 3/2004 |
| JP | 2005-303848 | 10/2005 |
| JP | 2005-333539 | 12/2005 |
| JP | 6484831 B | 3/2019 |

* cited by examiner

FIG. 9

| | OPERATOR A STATE | DEVICE A STATE | OPERATOR B STATE | DEVICE B STATE |
|---|---|---|---|---|
| < 1 > | NOTHING IS DONE | 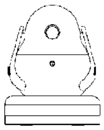 LED LIGHTING UNIT 107: TURNED ON | NOTHING IS DONE | 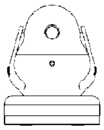 LED LIGHTING UNIT 107': TURNED ON |
| < 2 > | PRESS SWITCH 106 | 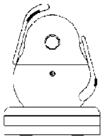 LED LIGHTING UNIT 107: TURNED OFF | NOTHING IS DONE | 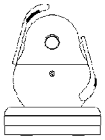 LED LIGHTING UNIT 107': TURNED ON |
| < 3 > | NOTHING IS DONE | 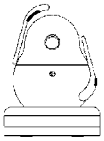 LED LIGHTING UNIT 107: TURNED OFF | NOTHING IS DONE | 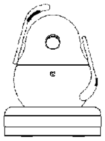 LED LIGHTING UNIT 107': TURNED ON |
| < 4 > | NOTHING IS DONE | 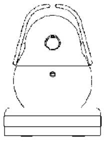 LED LIGHTING UNIT 107: TURNED OFF | PRESS SWITCH 106' | 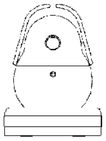 LED LIGHTING UNIT 107': TURNED OFF |
| < 5 > | NOTHING IS DONE | 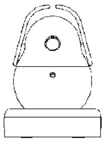 LED LIGHTING UNIT 107: TURNED OFF | NOTHING IS DONE | 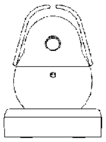 LED LIGHTING UNIT 107': TURNED OFF |
| AFTER 5:00 IN THE MORNING | | | | |
| < 6 > | NOTHING IS DONE | 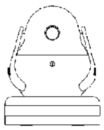 LED LIGHTING UNIT 107: TURNED ON | NOTHING IS DONE | 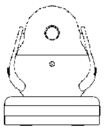 LED LIGHTING UNIT 107': TURNED ON |

FIG. 10

| | OPERATOR A STATE | DEVICE A STATE | OPERATOR B STATE | DEVICE B STATE |
|---|---|---|---|---|
| < 1 > | NOTHING IS DONE | 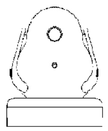 LED LIGHTING UNIT 107: TURNED ON | NOTHING IS DONE | 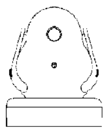 LED LIGHTING UNIT 107': TURNED ON |
| < 2 > | PRESS SWITCH 106 | 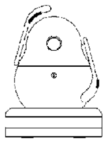 LED LIGHTING UNIT 107: TURNED OFF | NOTHING IS DONE | 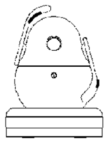 LED LIGHTING UNIT 107': TURNED ON |
| < 3 > | NOTHING IS DONE | 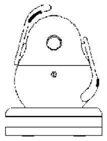 LED LIGHTING UNIT 107: TURNED OFF | NOTHING IS DONE | 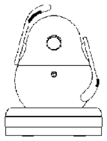 LED LIGHTING UNIT 107': TURNED ON |
| AFTER 5:00 IN THE MORNING | | | | |
| < 6 > | NOTHING IS DONE | 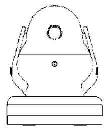 LED LIGHTING UNIT 107: TURNED ON | NOTHING IS DONE | 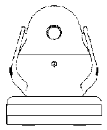 LED LIGHTING UNIT 107': TURNED ON |

TWO-WAY COMMUNICATION DEVICE SYSTEM

TECHNICAL FIELD

The present invention relates to a two-way communication device system.

BACKGROUND ART

Conventionally, as a method of communication performed by a person and a person in a remote place, there are a letter, a phone call, an e-mail, a social networking service (SNS), and the like With the spread of mobile phones, personal computers, and smartphones, these communications can be easily performed In addition, such a communication method can transmit various kinds of information such as characters, voices, images, and moving images.

On the other hand, in such a situation where a large amount of information can be transmitted, there is a case where the receiver is forced to reply, and there is also a problem that the sender side considers that there is some abnormality on the receiver side in a case where there is no reply in the middle As a result, the exchange of information may be stopped.

In order to solve such a problem, PTL 1 discloses a method in which a transmission device capable of transmitting a signal in an anonymous state and a reception device that performs an operation such as making a sound when receiving the signal are combined.

CITATION LIST

Patent Literature

PTL 1: Japanese Patent No. 6484831

SUMMARY OF THE INVENTION

In the method disclosed in PTL 1, it is possible to eliminate anxiety about the other party by maintaining anonymity, but the amount of information to be transmitted and received is extremely reduced because the existence of the other party with which communication is performed becomes invisible In addition, in the case of instantaneous information presentation such as a sound of the reception device, reception cannot be confirmed unless the receiver is always near the reception device, and as a result, it becomes difficult to reply, and further, it becomes difficult to exchange information.

The present invention solves the above-described conventional problems, and an object of the present invention is to provide a device capable of continuing transmission and reception while appropriately maintaining an information amount of communication while eliminating anxiety about the other party.

A two-way communication device system according to the present invention includes: a first two-way communication device; and a second two-way communication device installed at a different location from the first two-way communication device and configured to communicate with the first two-way communication device The two-way communication device system creates an operator input operation history when an input operation from an operator operating the first two-way communication device is received for the first time, transmits an input signal to the second two-way communication device when the operator input operation history is created, creates an other-device input operation history when an input signal is received from the second two-way communication device for the first time, maintains a first state when both the operator input operation history and the other-device input operation history do not exist, maintains a second state when only one of the operator input operation history and the other-device input operation history exists, maintains a third state when both the operator input operation history and the other-device input operation history exist, and deletes both the operator input operation history and the other-device input operation history at a specific cycle date and time.

According to the two-way communication device system according to the present invention, it is possible to reliably transmit information by constantly maintaining the transmission/reception state while specifying and recognizing a communication partner, and it is possible to continue transmission/reception without anxiety by reducing the burden of communicating with each other by limiting the transmission/reception cycle.

BRIEF DESCRIPTION OF THE DRAWINGS

FIG. 9 is an explanatory diagram of a first usage example of the two-way communication device.

FIG. 10 is an explanatory diagram of a second usage example of the two-way communication device.

DESCRIPTION OF EMBODIMENT

Hereinafter, an exemplary embodiment of the present invention will be described with reference to the drawings The same components are denoted by the same reference marks.

Figure 1:
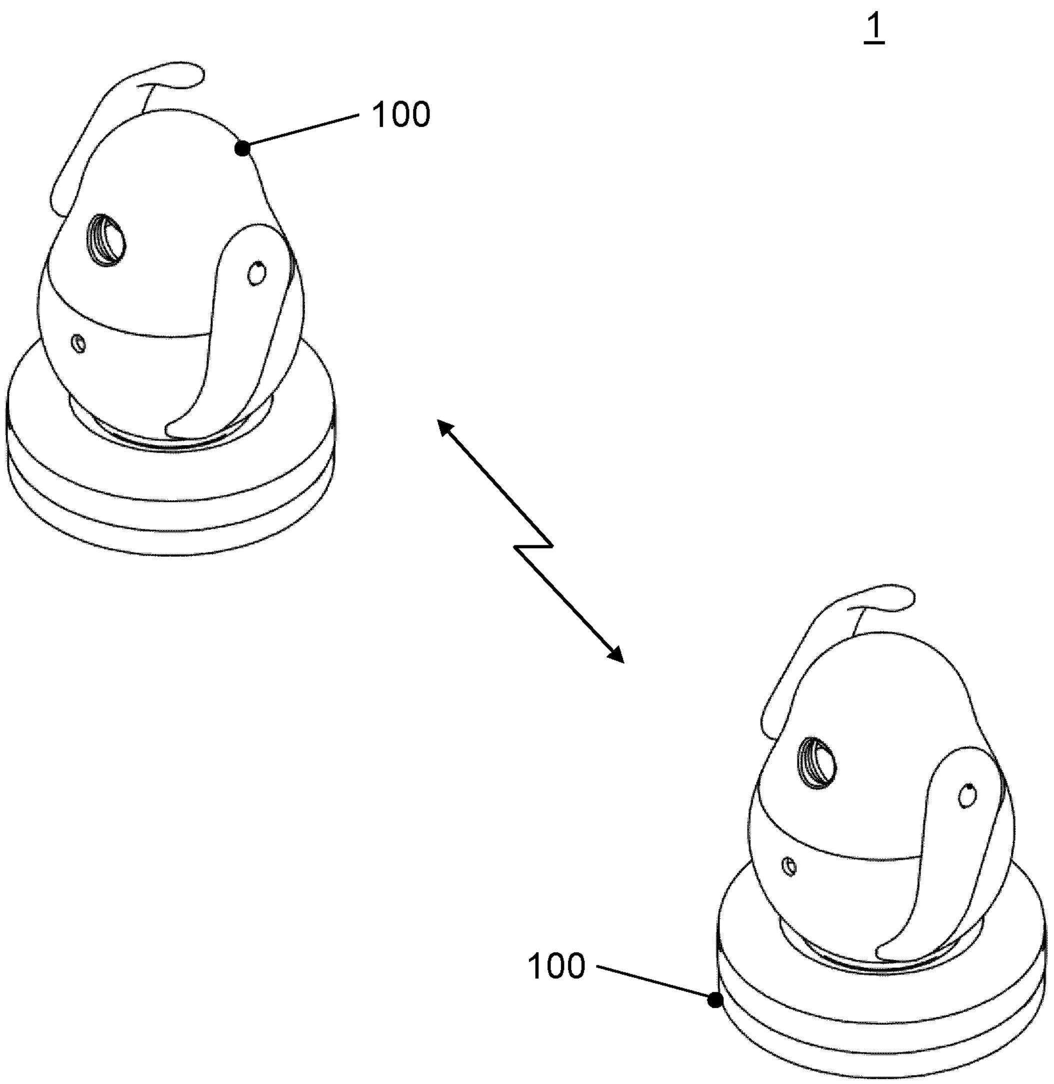
FIG. 1 is a schematic diagram of a two-way communication device system according to the present invention.

FIG. 1 is a schematic diagram of two-way communication device system 1 according to the present invention Two-way communication device system 1 includes two two-way communication devices 100 (first and second two-way communication devices) capable of communicating with each other via a network such as the Internet In use, there are two operators per set of two-way communication device system 1 That is, one operator operates one two-way communication device 100.

Figure 2:
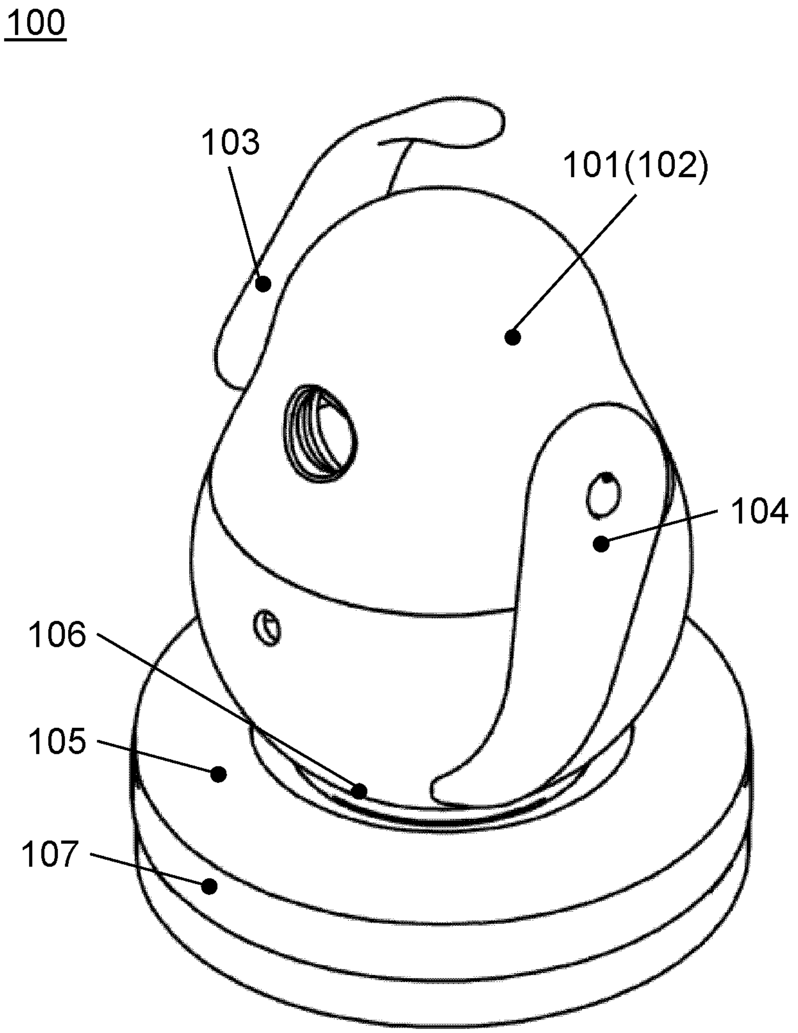
FIG. 2 is a schematic diagram of a two-way communication device constituting the two-way communication device system.

FIG. 2 is a schematic diagram of two-way communication device 100 according to a first exemplary embodiment of the present invention Two-way communication device 100 includes body 101 Controller 102 having a clock function is disposed inside body 101 Right arm 103 and left arm 104 are coupled to the outside of body 101 with one axis of rotatable freedom Controller 102 is configured to be able to move right arm 103 and left arm 104 In one example, controller 102 includes a memory and a processor that executes a program stored in the memory.

Base 105 is coupled to a bottom of body 101 with one degree of freedom in the vertical direction Switch 106 is fixed to base 105 When body 101 slides toward base 105 and body 101 comes into contact with switch 106, switch 106 is pressed Controller 102 is configured to be able to recognize that switch 106 is pressed LED lighting unit 107 including an LED (Light Emitting Diode) is disposed on base 105 Controller 102 is configured to be able to turn on, off, and blink the LED of LED lighting unit 107 Controller 102 controls LED lighting unit 107 to turn off the LED when an operator input operation history to be described later exists, and to turn on the LED when the operator input operation history does not exist That is, LED lighting unit 107 is an operator input operation specification unit whose state changes between when the operator input operation history exists and when the operator input operation history does not exist A device whose state changes between when the operator input operation history exists and when the operator input operation history does not exist can be employed as an operator input operation specification unit instead of LED lighting unit 107.

A control flow executed by controller 102 of two-way communication device 100 will be described with reference to FIGS. 3, 4, and 5.

Figure 3:
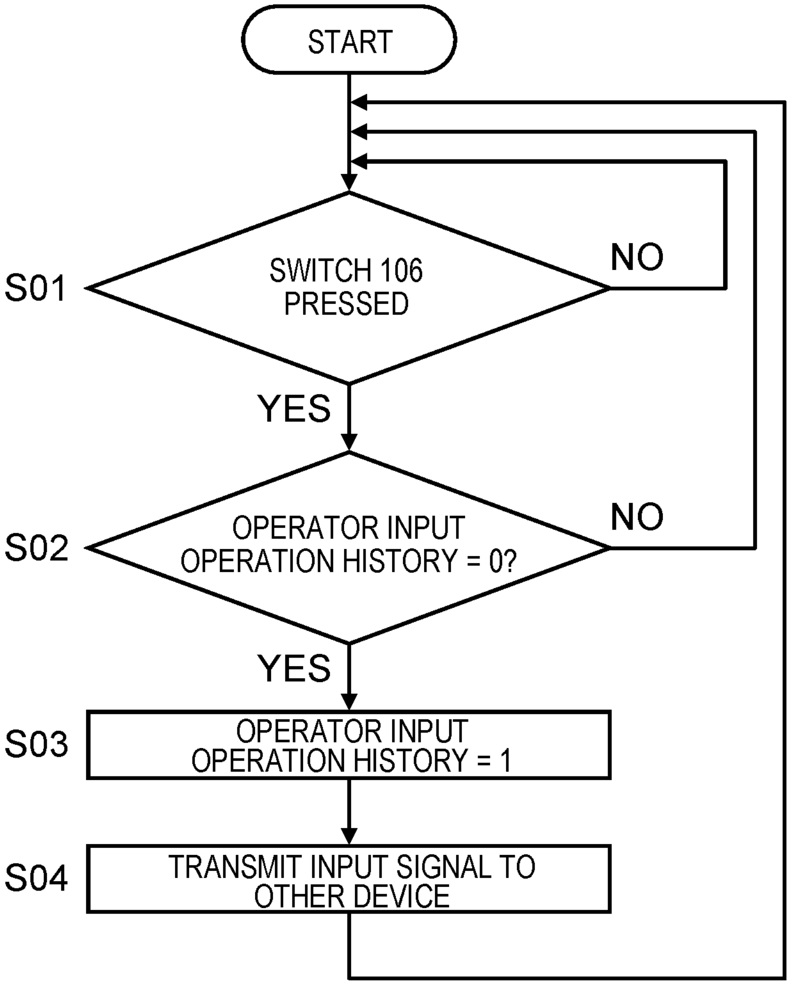
FIG. 3 is a control flowchart for a switch input of the two-way communication device.

As illustrated in FIG. 3, controller 102 determines whether or not switch 106 is pressed after the start of activation (S01) When switch 106 is not pressed (NO in S01), this determination is repeated When switch 106 is pressed (YES in S01), it is determined whether the operator input operation history owned inside controller 102 is zero (S02) When the operator input history is not zero (NO in S02), the control returns to before S01, and when the operator input history is zero (YES in S02), controller 102 sets the operator input operation history to one (S03) and transmits an input signal to other two-way communication device 100 forming a pair (S04) Thereafter, the control returns to before S01 As described above, controller 102 creates the operator input operation history by setting the operator input operation history to one.

Figure 4:
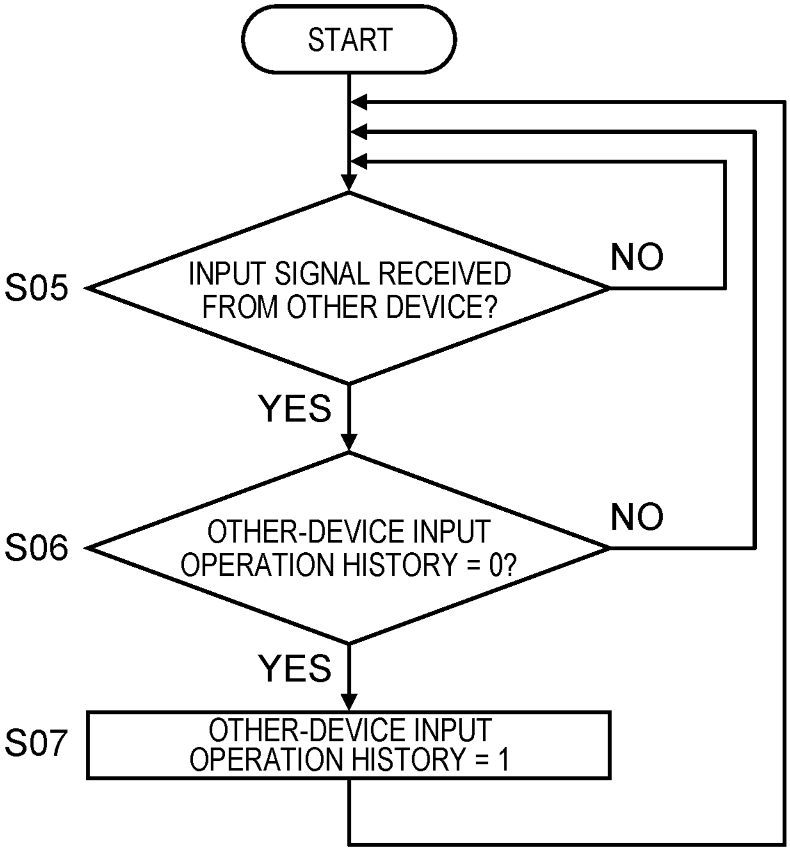
FIG. 4 is a control flowchart in communication with another two-way communication device constituting the two-way communication device system.

Controller 102 further determines whether an input signal is received from other two-way communication device 100 forming a pair after the start of the activation as illustrated in FIG. 4 (S05) When an input signal is not received (NO in S05), this determination is repeated When it is received (YES in S05), it is determined whether the other-device input operation history owned inside controller 102 is zero (S06) When the other-device input operation history is not zero (NO in S06), the control returns to before S05, and when the other-device input operation history is zero (YES in S06), controller 102 sets the other-device input operation history to one (S07) Thereafter, the control returns to before S05 As described above, controller 102 creates the other-device input operation history by setting the other-device input operation history to one.

Figure 5:
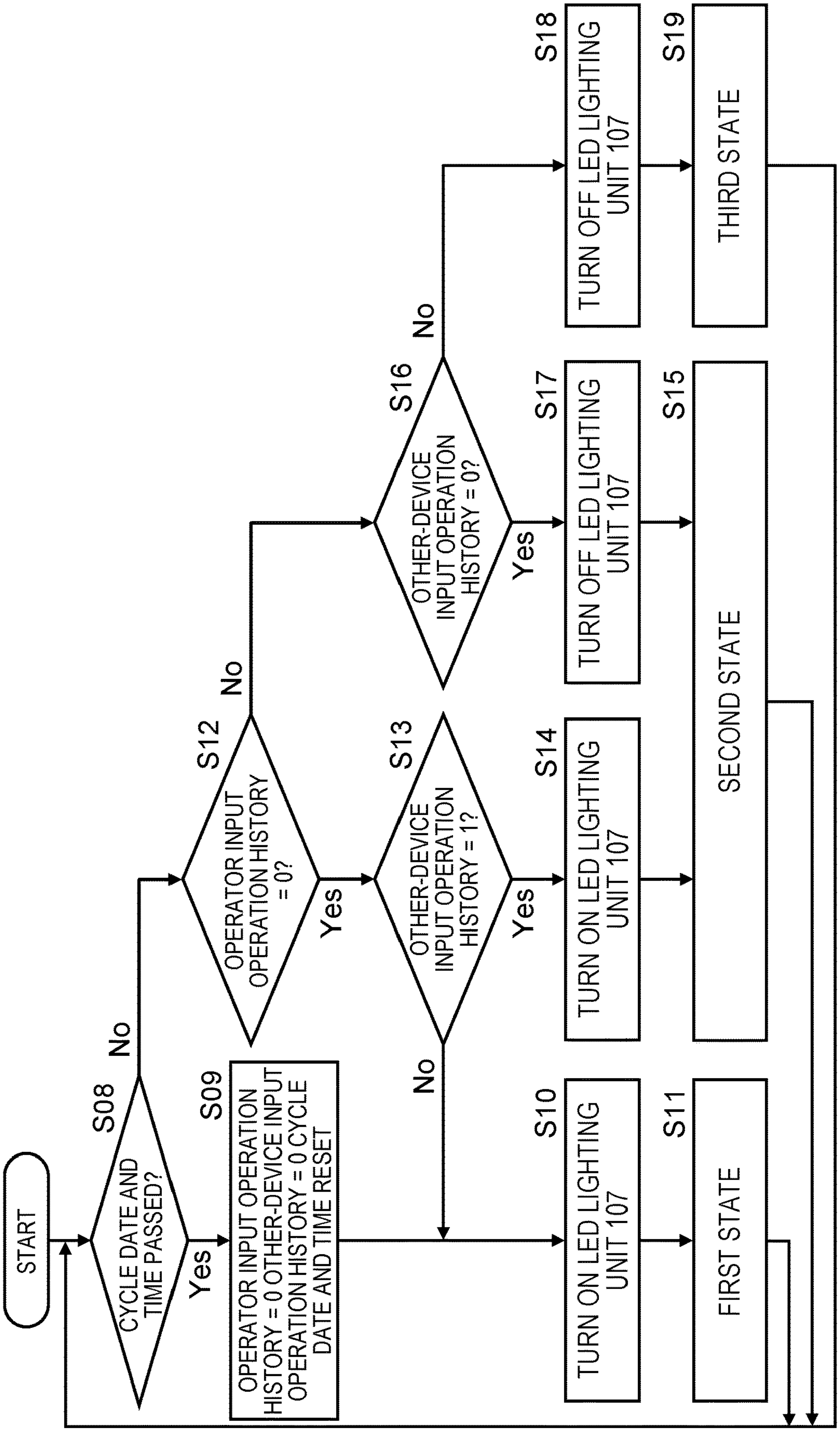
FIG. 5 is a main control flowchart of the two-way communication device.

Controller 102 further has the cycle date and time inside controller 102 As illustrated in FIG. 5, after the start of the activation, controller 102 determines whether the current time recognized by a clock function owned by controller 102 has passed the cycle date and time (S08).

When the current time has passed the cycle date and time (YES in S08), controller 102 sets the operator input operation history and the other-device input operation history owned inside controller 102 to zero, and resets the cycle date and time based on a preset cycle such as "the same time after one day" (S09).

Figure 6:
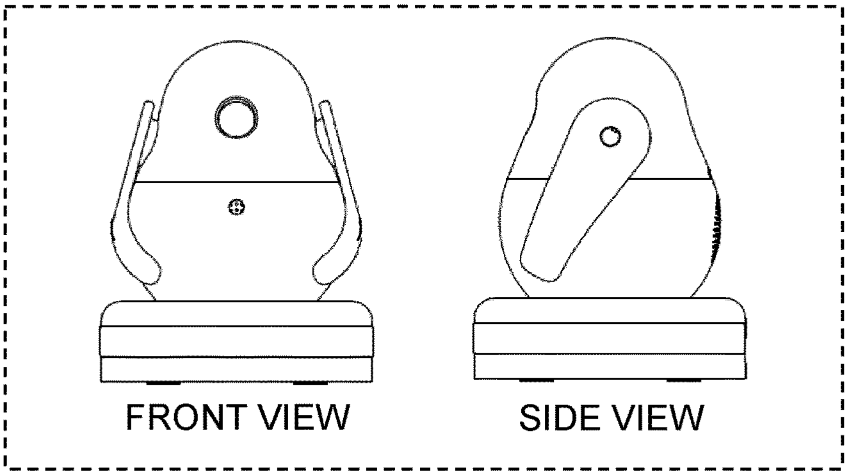
FIG. 6 is a schematic diagram of the two-way communication device in a first state.

Subsequently, controller 102 turns on LED lighting unit 107 (S10) Thereafter, controller 102 sets two-way communication device 100 to the first state in which right arm 103 and left arm 104 are lowered as illustrated in FIG. 6 (S11), and returns the control to before S08.

On the other hand, when the current time does not pass the cycle date and time (NO in S08), controller 102 determines whether the operator input operation history owned inside controller 102 is zero (S12) When the operator input operation history is zero (YES in S12), it is determined whether the other-device input operation history owned inside controller 102 is one (S13).

When it is determined that the other-device input operation history is not one (NO in S13), the control is shifted to before S10.

Figure 7:
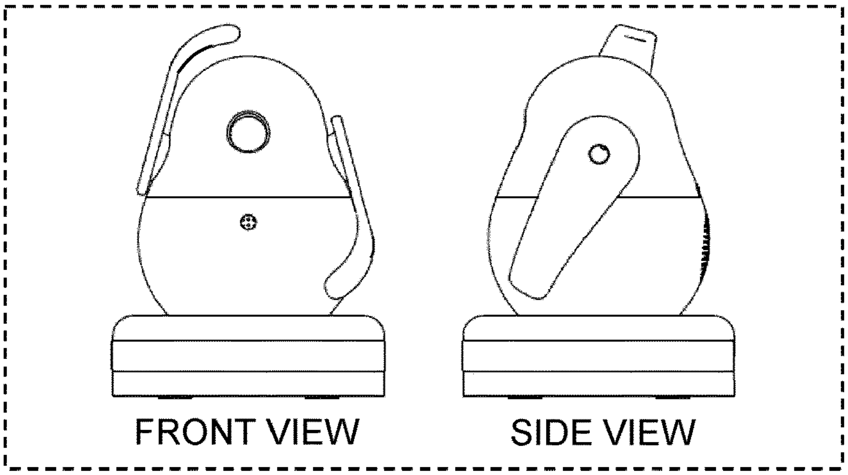
FIG. 7 is a schematic diagram of the two-way communication device in a second state.

When determining that the other-device input operation history is one (YES in S13), controller 102 turns on LED lighting unit 107 (S14) Thereafter, controller 102 sets two-way communication device 100 to the second state in which right arm 103 (an example of the first arm) is raised and left arm 104 (an example of the second arm) is lowered as illustrated in FIG. 7 (S15), and returns the control to before S08 Note that the second state may be a state in which right arm 103 is lowered and left arm 104 is raised.

On the other hand, when the operator input operation history is not zero (NO in S12), controller 102 determines whether the other-device input operation history owned inside controller 102 is zero (S16).

When the other-device input operation history is zero (YES in S16), controller 102 turns off LED lighting unit 107 (S17) Thereafter, controller 102 brings two-way communication device 100 into the second state (S15) and returns the control to before S08.

Figure 8:
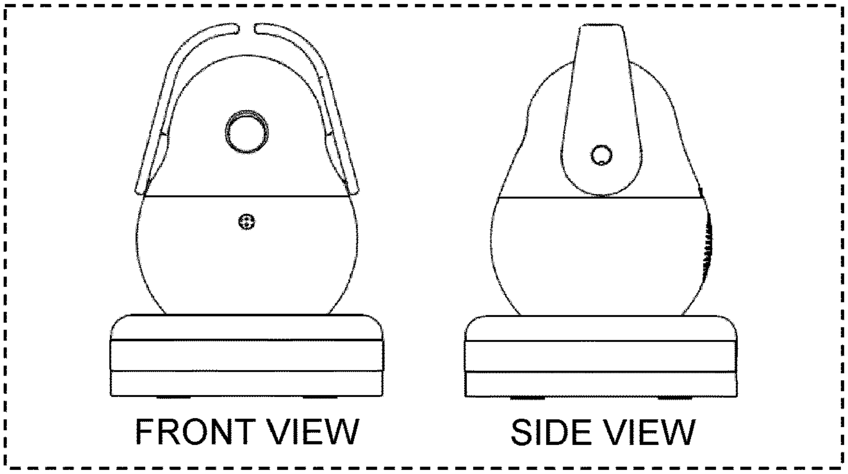
FIG. 8 is a schematic diagram of the two-way communication device in a third state.

On the other hand, when the other-device input operation history is not zero (NO in S16), controller 102 turns off LED lighting unit 107 (S18) Thereafter, controller 102 brings two-way communication device 100 into the third state in which right arm 103 and left arm 104 are raised as illustrated in FIG. 8 (S19), and returns the control to before S08.

Next, a state when the control flow illustrated in FIGS. 3, 4, and 5 is performed will be described with reference to FIG. 9 while illustrating how to use the control flow according to a specific scene.

One set of two two-way communication devices 100 is used by two operators Here, for easy understanding, an example will be described in which operator A uses device A, which is one of the two-way communication devices 100, and operator B uses device B paired with device A in two-way communication device 100 at a different location from operator A and device A Furthermore, with respect to the reference sign of each element of the two-way communication device, "'" is given to each element of device B For example, the controller of device A is denoted by reference numeral 102, and the controller of device B is denoted by reference numeral 102'.

First, device A and device B are in the first state (S11) (Hereinafter, the state of two-way communication device system 1 at this time is described as <1>.) The state at this time is a state in which operator A and operator B do not perform any operation on device A and device B, respectively At this time, LED lighting unit 107 of device A and LED lighting unit 107' of device B are turned on.

Next, operator A presses switch 106 of device A (Hereinafter, this state is described as <2>.) At this time, device A and device B are in the second state (S15) Further, LED lighting unit 107 of device A is turned off, and LED lighting unit 107' of device B remains turned on By turning off LED lighting unit 107 on the device side on which switch 106 is pressed in this manner, the operator can easily recognize that he/she has performed the transmission action.

Thereafter, device A and device B are in a state (Hereinafter, this state is described as <3>.) in which the second state (S15) is maintained, and the states of device A and device B are maintained regardless of how many times operator A presses switch 106 of device A Since the state is maintained, operator B does not always need to be in a range where operator B can see device B, and can grasp the current communication exchange situation at any timing.

In this state, when operator B presses switch 106' of device B, device A and device B enter the third state (S19) (Hereinafter, this state is described as <4>.) At this time, LED lighting unit 107 of device A and LED lighting unit 107' of device B are turned off Thus, both operator A and operator B can easily recognize that they have performed the transmission.

In addition, right arm 103 and left arm 104 of device A have arc shapes at tips thereof Therefore, in the third state (S19), right arm 103 and left arm 104 having their tips raised to the same height draw a circle Therefore, operator A and operator B can transmit each other and easily recognize that communication has been achieved Right arm 103' and left arm 104' of device B likewise draw circles with both arms. Therefore, operator B and operator A can transmit each other and easily recognize that communication has been achieved.

Thereafter, device A and device B maintain the third state (Hereinafter, this state is described as <5>.) In this state, even when operator A presses switch 106 of device A, the states of device A and device B do not change, and even when operator B presses switch 106' of device B, the states of device A and device B do not change This indicates that communication between operator A and operator B cannot be exchanged any more Therefore, operator A does not need to press switch 106 of device A as a reply from operator B, and operator B does not become anxious because operator A does not press switch 106 of device A.

Thereafter, for example, in a case where the cycle date and time is set to 5:00 every morning, at 5:00 AM on the next day, device A and device B return to the first state (S11) (Hereinafter, this state is described as <1>.) This state <6> is the same as state <1> That is, communication between operator A and operator B can be exchanged again.

In addition, as illustrated in FIG. 10, when 5:00 AM set as the cycle date and time elapses at the stage of proceeding to state <1>, state <2>, and state <3> as in FIG. 9, the state of two-way communication device system 1 returns to state <1> In this way, it is possible to reset the feeling for each cycle date and time and resume exchange of the communication between operator A and operator B.

Note that the input from the operator may be an action other than pressing switch 106 That is, a single action "with an intention of communication" from the operator (for example, operator A) to the communication partner (for example, operator B) is sufficient For example, two-way communication device 100 may include a microphone instead of switch 106, and a call of greetings to two-way communication device 100 may be used as an input from the operator In this way, input can be easily performed even in a situation where a hand cannot be released Here, "with an intention of communication" means that communication to a communication partner is intentionally performed Therefore, the operation in conjunction with the switch operation performed with the intention of turning on the room light does not have the intention of communication, and thus cannot be replaced with the operation of pressing switch 106.

In addition, two-way communication device 100 performs the same operation (raising and lowering of right arm 103 and left arm 104) as other two-way communication devices 100 forming a pair in all the states of the first state, the second state, and the third state In this way, even if two-way communication devices 100 forming a pair are located at places away from each other, it is possible to give the operator a feeling of being connected and existing in the same space since the devices are in the same state.

INDUSTRIAL APPLICABILITY

The two-way communication device system of the present invention can continue communication without giving anxiety or load by limiting communication exchange to the minimum Therefore, as a communication means different from a telephone or a mail by a mobile phone or a personal computer currently used, it can be used to perform communication with an appropriate sense of distance to the other party.

REFERENCE MARKS IN THE DRAWINGS

1: two-way communication device system
100: two-way communication device
101: body
102: controller
103: right arm
104: left arm
105: base
106: switch
107: LED lighting unit

The invention claimed is:

1. A two-way communication device system, comprising:

a first two-way communication device including a controller having a clock function; and a second two-way communication device installed at a different location from a location of the first two-way communication device and configured to communicate with the first two-way communication device, wherein the controller included in the first two-way communication device creates an operator input operation history when the first two-way communication device receives an input operation from an operator operating the first two-way communication device for a first time, the controller included in the first two-way communication device transmits an input signal to the second two-way communication device when the first two-way communication device creates the operator input operation history, the controller included in the first two-way communication device creates an other-device input operation history when the first two-way communication device receives an input signal from the second two-way communication device for the first time, the controller included in the first two-way communication device sets the first two-way communication device to a first state when both the operator input operation history and the other-device input operation history do not exist, the controller included in the first two-way communication device sets the first two-way communication device to a second state when only one of the operator input operation history and the other-device input operation history exists, the controller included in the first two-way communication device sets the first two-way communication device to a third state when both the operator input operation history and the other-device input operation history exist, when a current time recognized by the clock function has passed the specific date and time, the controller included in the first two-way communication device (i) deletes both the operator input operation history and the other-device input operation history at a specific cycle date and time and (ii) resets the specific cycle date and time, each of the first and second two-way communication devices includes two arms including a first arm and a second arm, and is configured such that (i) in the first state, the two arms are lowered, (ii) in the second state, the first arm is raised and the second arm is lowered, and (iii) in the third state, the two arms are raised, and each of the first and second arms has a shape drawing an arc.

2. The two-way communication device system according to claim 1, wherein the first two-way communication device is configured to receive a single action performed by the operator as the input operation.

3. The two-way communication device system according to claim 1, wherein each of the first and second two-way communication devices includes an operator input operation specification unit whose state changes between when the operator input operation history exists and when the operator input operation history does not exist.

4. The two-way communication device system according to claim 1, wherein each of the first and second two-way communication devices is configured to maintain an action that specifies that the first and second two-way communication devices are in a same state as each other in any of the first state, the second state, and the third state.

* * * * *